G. L. RUBERT.
LINER PLATE FOR CREAM SEPARATORS.
APPLICATION FILED JAN. 4, 1913.
1,090,755. Patented Mar. 17, 1914.
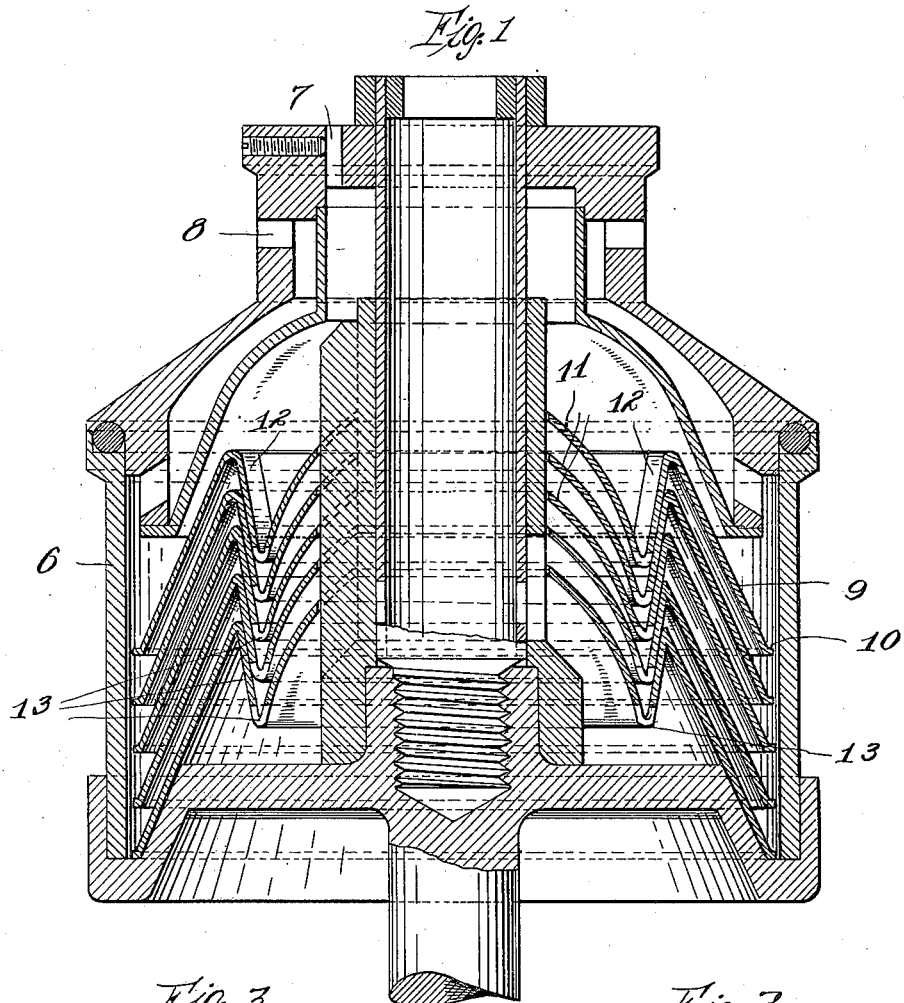
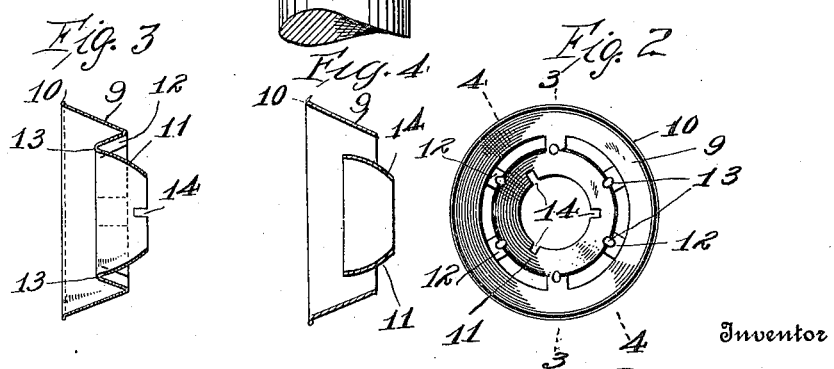
Witnesses
Robert M. Sutphen
Cameron H. Knight
Inventor
George L. Rubert
By Knight Bros.
his Attorney

UNITED STATES PATENT OFFICE.

GEORGE L. RUBERT, OF LA CROSSE, WISCONSIN, ASSIGNOR OF ONE-HALF TO LEW W. WARREN, OF LA CROSSE, WISCONSIN.

LINER-PLATE FOR CREAM-SEPARATORS.

1,090,755.  Specification of Letters Patent.  Patented Mar. 17, 1914.

Application filed January 4, 1913. Serial No. 740,192.

*To all whom it may concern:*

Be it known that I, GEORGE L. RUBERT, a citizen of the United States, residing at La Crosse, in the county of La Crosse and State of Wisconsin, have invented certain new and useful Improvements in Liner-Plates for Cream-Separators, of which the following is a specification.

The object of my invention is to provide a compound liner plate for cream separators which will not take up much more room than a single liner plate and which will provide an enlarged passage-way for the cream, thereby facilitating the separation of the cream and its passage from the bowl; and with this and minor objects in view my invention consists in the parts and combination of parts as will be hereinafter more specifically set out.

In the drawing: Figure 1 is a vertical central section through a separator bowl embodying my invention. Fig. 2 is a top plan view of a liner plate embodying my invention. Fig. 3 is a section on the line 3—3 of Fig. 2. Fig. 4 is a section on the line 4—4, Fig. 2.

The reference numeral 6 represents a bowl of any approved construction in which I have positioned my improved compound liner plates.

7 is the cream exit from the bowl, and 8 the skim milk exit. My improved compound liner plate comprises the outer truncated cone 9 provided with an annular flange 10 at its base. 11 is a second truncated cone depending in the outer cone 10 and supported by means of the straps 12. While I have shown six of these straps in the drawings, it will, of course be understood that the number may be varied as may be found necessary or desirable. At the juncture of the strap 12 and the inner cone 11 I provide a perforation 13.

14 are notches formed in the upper edge of the inner cone 11. It will be noted that the inner cone 11 is of less diameter than the outer cone 9 and is formed on a different angle from the cone 9, said inner cone being held spaced from the outer cone by means of the spacing straps 12. By reason of the difference in angle between the outer cone 9 and the inner cone 11, I provide a cream space or passage in each compound plate of increasing width in the direction of the flow of the cream in the process of separation, thereby facilitating the flow of the cream in each plate. As shown in Fig. 1, these compound cones can be readily nested and provide a materially increased area and that said increased area is obtained without increasing the size of the bowl. In effect, I obtain the effect of two distinct sets of liner plates on a single core or center-piece.

By having a gradual increasing space in the direction of the travel of cream and a comparatively restricted space in an opposite direction for the travel of the skimmed milk, I am enabled to effect a better separation of the cream from the milk, inasmuch as the restricted spaces offer a resistance to the passage of the cream through them, thus forcing the cream in the less restricted spaces formed between the inner and outer cones.

What I claim is:

1. In a centrifugal machine, a series of superimposed coaxially arranged liners, each comprising an inner wall and an outer wall inclined in the same general direction to the axis; corresponding walls of the respective liners being spheroidal, whereby upwardly enlarging spaces are provided between said last-named walls.

2. In a centrifugal machine, a series of superimposed coaxially arranged liners, each comprising an inner wall and an outer wall inclined in the same general direction to the axis; the inner wall of each liner being spheroidal, whereby upwardly enlarging spaces are provided between said last-named walls.

3. In a centrifugal machine, a series of superimposed coaxially arranged liners, each comprising an inner wall and an outer wall inclined in the same general direction to the axis; the inner wall of each liner being spheroidal, whereby upwardly enlarging spaces are provided between said last-named walls, and the outer wall of each liner being frusto-conical.

4. In a centrifugal machine, a series of superimposed coaxially arranged liners, each comprising an inner wall and an outer wall inclined in substantially the same direction to the axis, but a slightly different angles thereto.

5. In a centrifugal machine, a series of superimposed coaxially arranged liners, each comprising an inner wall and an outer wall inclined in the same general direction to the axis; the inner wall of each liner being spheroidal, whereby upwardly enlarging spaces are provided between said fast-named walls, and the outer wall of each liner being frusto-conical; said inner and outer walls of each liner being radially overlapped.

6. In a centrifugal machine, a series of superimposed coaxially arranged liners, each comprising an inner wall and an outer wall inclined in the same general direction to the axis; the inner wall of each liner being spheroidal, whereby upwardly enlarging spaces are provided between said last-named walls, and the outer wall of each liner being frusto-conical; said inner and outer walls of each liner being radially overlapped, and each outer wall commencing and ending at a lower level than the commencing and ending of the inner wall of the same liner plate.

7. In a centrifugal machine, a series of superimposed coaxially arranged liners, each comprising an inner wall and an outer wall inclined in substantially the same direction to the axis; said inner and outer walls of each liner being radially overlapped, and being provided with circumferentially narrow connecting bars extending from the lower edge of the inner wall to the upper edge of the outer wall; said connecting bars resting one upon another and spacing the liners in series.

The foregoing specification signed at La Crosse, Wis., this 24 day of December, 1912.

GEORGE L. RUBERT.

In presence of two witnesses—
JOHN L. JOHNSON,
NIC. BECKER.

---

Copies of this patent may be obtained for five cents each, by addressing the "Commissioner of Patents, Washington, D. C."